United States Patent Office 3,713,018
Patented Jan. 23, 1973

3,713,018
ELECTRONIC PHOTO FLASH APPARATUS OPERATING FROM ALTERNATING CURRENT CIRCUITS OF DIFFERENT VOLTAGES
Christhard Tscheuschner, Braunschweig, Germany, assignor to Rollei-Werke Franke & Heidecke, Braunschweig, Germany
Filed July 1, 1971, Ser. No. 158,955
Claims priority, application Germany, July 2, 1970,
P 20 32 733.7
Int. Cl. G05f 5/00; H02m 7/24
U.S. Cl. 321—15
7 Claims

ABSTRACT OF THE DISCLOSURE

Electronic photo flash apparatus powered by energy stored in capacitors which are charged from alternating current circuits or "mains." Circuits are provided to enable the capacitors to be charged to approximately the same voltage each time, even though at times the apparatus may be plugged into an alternating current circuit having one of the standard voltages (e.g., 110 or 115 volts) and at other times may be plugged into an alternating current circuit having one of the other standard voltages substantially double the first mentioned voltage (e.g., 220 or 230 volts). In one embodiment, a hand operated switch is used, depending upon the voltage of the mains into which the apparatus is plugged. In another embodiment, the apparatus functions automatically in response to the voltage into which it is plugged, and manual actuation of a switch is not necessary.

BACKGROUND OF THE INVENTION

Electronic photo flash apparatus in which the flash is powered from the charge stored in one or more capacitors, is well known. Frequently the capacitors are charged from a battery. It is also known in the art, however, to charge the capacitors from alternating current such as available in ordinary domestic circuits or "mains," the apparatus being simply plugged into the available alternating current circuits.

In some localities the ordinary standard house current potential is approximately 110 or 115 volts. In other localities, the ordinary standard house current is double this potential, or approximately 220 or 230 volts. Yet it is highly desirable that the capacitor or capacitors used to power the flash be charged to approximately the same potential each time they are charged, rather than being charged to one potential when the apparatus happens to be plugged into mains of, say, 110 volts, and being charged to a different potential when the apparatus happens to be plugged into mains of, say, 220 volts. The circuitry of the present invention is designed to accomplish this; that is, to enable the capacitors to be charged to the same potential, whether the apparatus is plugged into an alternating current circuit of what may be called the lower domestic standard voltage, or whether it is plugged into an alternating current circuit of double this voltage or the higher domestic standard voltage. In one embodiment of the present invention, the shift is accomplished by manual switching means, and in another embodiment it is accomplished automatically so that the user need not concern himself with which of the two standard voltages he is plugging the apparatus into.

It is therefore an important object of the present invention to provide electronic photo flash apparatus capable of operating satisfactorily from either one of two alternating current voltages, one of the voltages being approximately double the other voltage.

Another object is the provision of such flash apparatus in a relatively simple form, easily and expensively manufactured and easy to maintain in operating condition.

Still another object is the provision of apparatus so designed that it will automatically accommodate itself to whichever one of the two standard voltages it is connected to, thus making it unnecessary for the user to determine in advance which voltage is supplied to the outlet into which he wishes to plug the flash apparatus.

DESCRIPTION OF THE PREFERRED EMBODIMENTS

Figure 1:
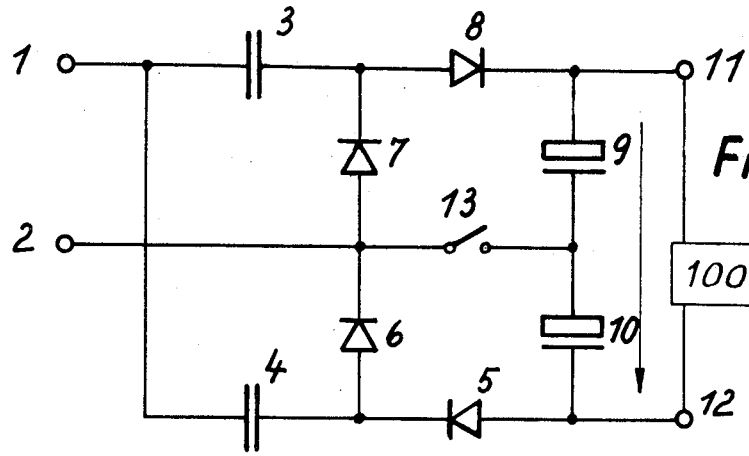
FIG. 1 is a schematic wiring diagram illustrating the basic structure of the circuit for charging the capacitors from the alternating current mains, with a mechanical change-over switch for shifting from one mains voltage to another.

Referring first to the embodiment illustrated in FIG. 1, the terminals 1 and 2 are connected to a conventional plug which can be plugged into a conventional outlet supplying alternating current at either one of two standard or widely used voltages, such as 110 or 115 A.C. voltage commonly used as the domestic standard in many localities, or 220 or 230 A.C. voltage commonly used as the domestic standard in other localities. Through the circuit connections illustrated and readily understood by those familiar with wiring diagrams, these terminals 1 and 2 are connected to the capacitors 3 and 4, the diodes 5, 6, 7, and 8, and the two storage capacitors 9 and 10 which are connected in series and which are the main storage capacitors furnishing power for the flash. This construction provides two doubling circuits of the Greinacher type. The operating D.C. voltage is taken from the terminals 11 and 12, to the flash tube and associated control parts schematically indicated at 100. The present invention is concerned with providing the desired charges in the main capacitors 9 and 10, and is not concerned with the details of the flash tube and associated control parts for firing the tube and for quenching the flash at the desired time. The tube and the control parts may be conventional and are subject to wide variation as well understood in the art, the details being unimportant for purposes of the present invention and hence shown only schematically at 100.

The central branch of the circuit may be subdivided by the switch 13. If an alternating current voltage U prevails in the input terminals 1 and 2, then when the switch 13 is closed the total direct current voltage in the storage capacitors will be $U \times 4 \times \sqrt{2}$. On the other hand, when the switch 13 is open, the total or combined D.C. voltage on the storage capacitors will be $U \times 2 \times \sqrt{2}$. Therefore, if the switch 13 is closed and if the terminals 1 and 2 are plugged into an outlet supplying A.C. at 110 volts, this will lead to a combined D.C. voltage of 622 volts at the terminals 11 and 12. But if the switch 13 is open rather than closed, A.C. voltage of 220 volts applied to the input terminals 1 and 2 will result in the same D.C. voltage of 622 volts across the terminals 11 and 12. Thus by simply opening or closing the switch 13, the apparatus can be switched over to the lower mains voltage or the higher mains voltage (which is double the lower voltage) to obtain the same desired charge on the storage capacitors in either case.

Figure 2:
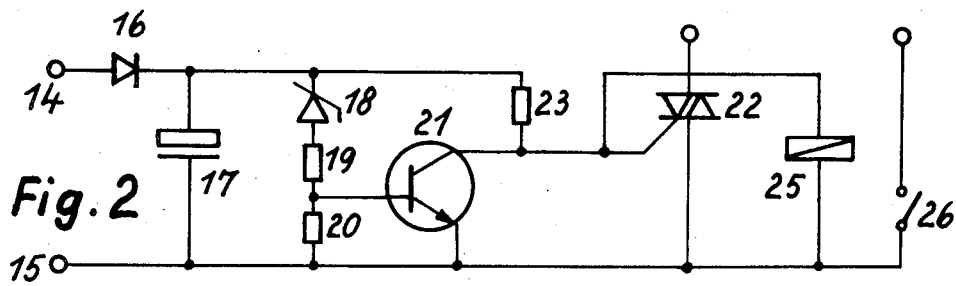
FIG. 2 is a schematic diagram illustrating the change-over switch as an electro-mechanical or electronic relay.

If the switch 13 is a manual switch, the operator must ascertain in some appropriate manner whether the outlet into which he is plugging the device is supplied with current at the lower standard voltage (approximately 110 volts) or at the higher standard voltage (approximately 220 volts). However, it is possible according to the present invention to make the switching change automatically, so that the operator need not ascertain the voltage into which he is plugging the flash apparatus. FIG. 2 shows two different forms of automatic change-over means.

An alternating current voltage proportional to the mains voltage is applied to the terminals 14 and 15 in FIG. 2, and a direct current voltage is taken from the capacitor 17 by means of the diode 16. The Zener diode 18 and the voltage divider 19, 20 are so dimensioned that with an alternating current voltage of 110 volts applied, the transistor 21 is without current. A current rendering the triac 22 live will then flow into the gate of the triac 22, through the resistor 23. This triac 22 may replace the switch 13 in FIG. 1. With a mains potential of 220 volts, the transistor 21 is conductive and prevents an increase in the voltage in the gate of the triac 22, so that the triac is non-conductive, a condition which corresponds to the switch 13 being open if the triac 22 replaces the switch 13.

The same current which is used to operate the gate of the triac 22 may also be used to operate the relay coil 25 of a normally open relay switch 26 used in place of the switch 13. Thus when the mains voltage is 110 volts, the transistor 21 being non-conductive, the resistor 23 supplies current not only to the gate of the triac 22 to make the triac conductive, but also to the relay coil 25, so that the coil will pull the switch member 26 to a closed condition. However, when the mains voltage is 220 volts, the transistor 21 is conductive as above explained, preventing sufficient flow of current to the triac 22 to make it conductive and preventing sufficient flow of current to the coil 25 to keep the switch 26 closed. Thus both the triac 22 and the switch 26 are in the open or non-conductive condition. Hence either the triac 22 or the relay switch 26 may be substituted for the manual switch 13 in FIG. 1, to accomplish the change-over automatically.

Figure 3:
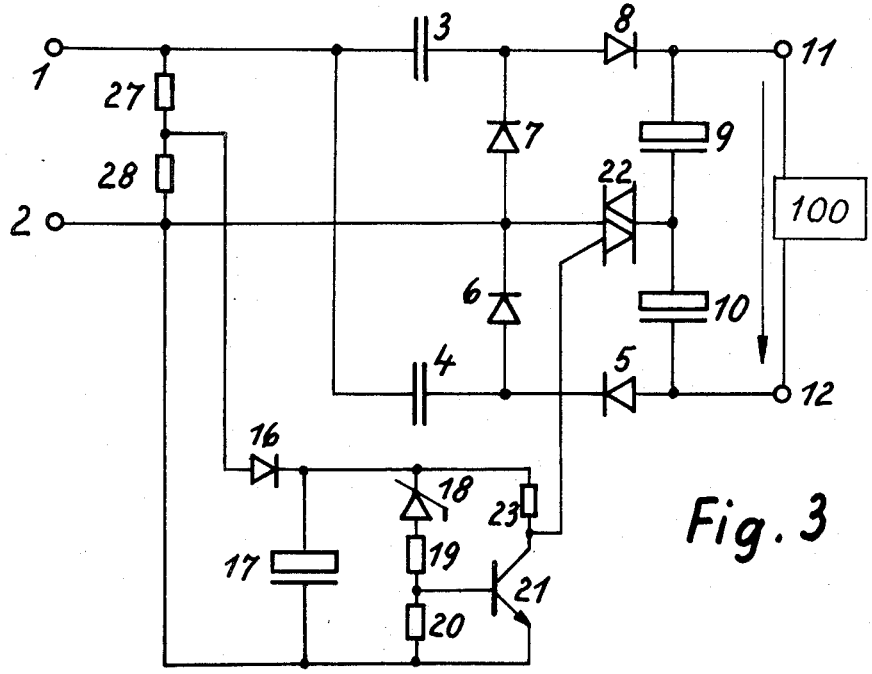
FIG. 3 is a schematic wiring diagram of another embodiment of the apparatus, in which the change-over from one mains voltage to another is accomplished automatically by electronic means.

FIG. 3 shows the complete circuit diagram of an embodiment of the apparatus with the automatic change-over. Thus it is a combination of the circuitry shown in FIG. 1 with the necessary parts from FIG. 2 to replace the manual switch 13. It is seen in FIG. 3 that the automatic control circuit (like FIG. 2) is supplied with alternating voltage proportional to the mains voltage, from the voltage divider 27, 28, and the triac 22 has been included in place of the switch 13. The parts in FIG. 3 are identified by the same reference numerals used in FIGS. 1 and 2 for the corresponding parts, and it is thought that no further detailed description is needed.

What is claimed is:

1. Electronic photo flash apparatus adapted to be operated at will from alternating current mains of a first input voltage or of a second input voltage approximately double the first voltage, comprising two storage capacitors connected in series with each other and serving as a source of power for a flash, input terminals adapted to be connected to alternating current mains of either of said two voltages, doubling circuits of the Greinacher type operatively connecting said input terminals to said storage capacitors, said doubling circuits including a branch connected to a junction between said two storage capacitors, and switch means in said branch, said switch means being operable for changing from one input voltage to the other input voltage to obtain approximately the same voltage charge in said storage capacitors in either case.

2. Apparatus as defined in claim 1, wherein said switch means is a manually operated switch.

3. Apparatus as defined in claim 1, wherein said switch means is automatically responsive to the input voltage, to make said switch means conductive when said apparatus is connected to said first input voltage and non-conductive when connected to said second input voltage.

4. Apparatus as defined in claim 1, wherein said switch means includes a relay coil 25 for operating a switch 26, operation of said relay coil being dependent upon the mains voltage to which said apparatus is connected.

5. Apparatus as defined in claim 1, wherein said switch means includes an electronic switch 22 which opens or closes in accordance with the mains voltage to which said appartus is connected.

6. Apparatus as defined in claim 5, wherein said electronic switch 22 is a triac.

7. Apparatus as defined in claim 1, in which said switch means includes a triac 22 acting as a switch in said branch, and a Zener diode 18 and a transistor 21 operated by direct current potential proportional to the alternating current potential in the mains to which the apparatus is connected, said Zener diode and transistor being operatively connected to said triac to cause said triac to be conducting when said current mains are at said first input voltage and to cause said triac to be substantially non-conducting when said current mains are at said second input voltage.

References Cited

UNITED STATES PATENTS

| 3,526,821 | 1/1970 | Thomas | 307—110 X |
| 3,539,865 | 11/1970 | Billings | 323—8 X |

FOREIGN PATENTS

| 134,301 | 1933 | Austria | 321—15 |
| 877,011 | 1953 | Germany | 321—15 |

GERALD GOLDBERG, Primary Examiner

U.S. Cl. X.R.

307—109; 320—1; 323—22 SC